(12) United States Patent
Bean et al.

(10) Patent No.: US 6,827,176 B2
(45) Date of Patent: Dec. 7, 2004

(54) VEHICLE WITH OFFSET EXTENDIBLE AXLES AND INDEPENDENT FOUR-WHEEL STEERING CONTROL

(75) Inventors: Andrew J. Bean, Greencastle, PA (US); Michael J. Blumberg, Chambersburg, PA (US); Richard J. Livdahl, West Fargo, ND (US); Lex A. Mellott, Warfordsburg, PA (US)

(73) Assignee: JLG Industries, Inc., McConnellsburg, PA (US)

( * ) Notice: Subject to any disclaimer, the term of this patent is extended or adjusted under 35 U.S.C. 154(b) by 0 days.

(21) Appl. No.: 10/337,385

(22) Filed: Jan. 7, 2003

(65) Prior Publication Data

US 2004/0129491 A1 Jul. 8, 2004

(51) Int. Cl.⁷ .............................. B62D 7/06; B62D 5/06
(52) U.S. Cl. ..................... 180/411; 180/414; 180/906
(58) Field of Search ................................ 180/411, 906, 180/408, 414, 415

(56) References Cited

U.S. PATENT DOCUMENTS

| | | |
|---|---|---|
| 844,615 A | 2/1907 | Palmer |
| 1,658,432 A | 2/1928 | Eden, Jr. |
| 3,064,993 A | 11/1962 | Tangjerd |
| 3,154,164 A * | 10/1964 | Shaw et al. .................. 180/209 |
| 3,235,283 A * | 2/1966 | De Voghel .................. 180/409 |
| 3,305,041 A | 2/1967 | Schramm |
| 3,424,023 A | 1/1969 | Mustered et al. |
| 3,724,585 A | 4/1973 | Conrad |
| 3,856,102 A | 12/1974 | Queen |
| 3,899,037 A | 8/1975 | Yuker |
| 3,903,983 A | 9/1975 | Yeske |
| 4,090,581 A | 5/1978 | Miner et al. |
| 4,109,747 A | 8/1978 | Hornagold et al. |
| 4,263,979 A * | 4/1981 | Sturgill ........................ 180/411 |
| 4,504,074 A | 3/1985 | Smith |
| 4,592,439 A | 6/1986 | Collard et al. |
| 4,599,030 A | 7/1986 | Skaalen et al. |
| 4,700,960 A | 10/1987 | Miki et al. |
| 5,039,129 A * | 8/1991 | Balmer ........................ 180/308 |
| 5,489,114 A | 2/1996 | Ward et al. |
| 5,492,348 A | 2/1996 | Shaw et al. |
| 5,699,873 A * | 12/1997 | Moriya et al. .............. 180/402 |
| 5,924,503 A | 7/1999 | Lykken |
| 5,996,722 A | 12/1999 | Price |
| 6,199,769 B1 * | 3/2001 | Weddle ........................ 239/172 |
| 6,206,125 B1 | 3/2001 | Weddle |
| 6,557,658 B1 * | 5/2003 | Enmeiji et al. .............. 180/236 |

OTHER PUBLICATIONS

Ogando, Joseph, "Loaders Put Embedded System in the Driver's Seat", Design News, Sep. 23, 2002, pp. 52–54.

* cited by examiner

Primary Examiner—Kevin Hurley
(74) Attorney, Agent, or Firm—Nixon & Vanderhye P.C.

(57) ABSTRACT

A vehicle includes a chassis supporting two front axle assemblies and two rear axle assemblies. Each of the front and rear axle assemblies includes an extendible and retractable axle supporting an independently steerable wheel and a steering mechanism. The axles of the respective front and rear axle assemblies are offset from each other. By providing independently steerable wheels, the vehicle is operable in a plurality of steering modes including two-wheel steer, crab steer and coordinated steer. A steering angle for each steering wheel is determined according to a steering angle of an inside front wheel on a turn-by-turn basis.

19 Claims, 10 Drawing Sheets

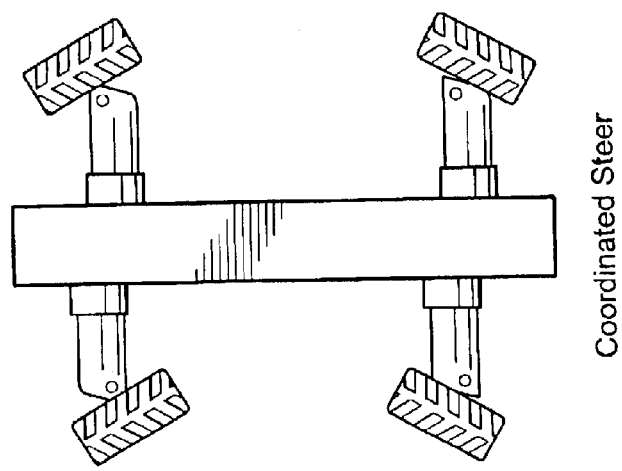
Fig. 1C Coordinated Steer
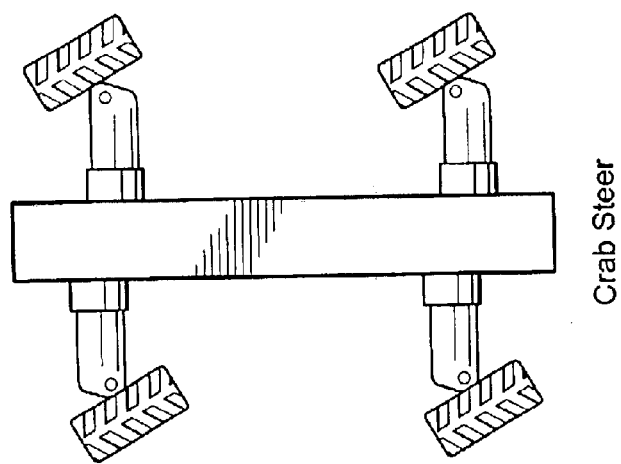
Fig. 1B Crab Steer
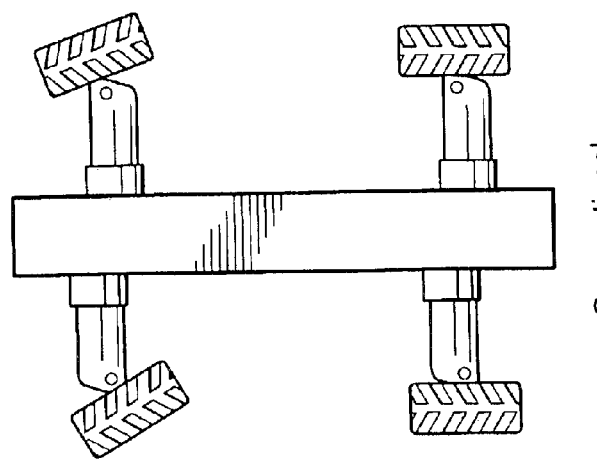
Fig. 1A Conventional Two Wheel Steer

VEHICLE WITH OFFSET EXTENDIBLE AXLES AND INDEPENDENT FOUR-WHEEL STEERING CONTROL

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND AND SUMMARY OF THE INVENTION

The present invention relates generally to industrial vehicles such as boom lifts, platform vehicles and the like and, more particularly, to an extendible axle assembly for such vehicles incorporating four-wheel independent steering control.

An important design consideration for industrial vehicles such as boom lifts and the like relates to vehicle stability, particularly when the boom or platform is raised or extended or otherwise loaded to create an overturning moment on the vehicle. With a given overturning moment, the vehicle stability is a function of the amount of counterweight provided or the position of the ground contact points. These ground contact points, in the case of this present invention, are the wheels or tires on the vehicle chassis. For a given weight, the wider the chassis, the more stable the vehicle. Therefore, lighter more cost effective vehicles can be obtained with wider chassis designs. This is in direct conflict with the desire to minimize the chassis width to allow for ease of transport when the stability is not a concern, particularly when the vehicle must meet the requirements of highway transportation limitations for size.

To address this concern, it would be desirable to provide a vehicle incorporating extendible axles so that a chassis can be maintained narrow enough for on-highway transportation without special permits while providing a satisfactory amount of stability during use and operation of the vehicle lifting components. Typically, vehicles incorporating extendible axles use axles that share a common centerline either by telescoping one out of the other or meeting in the middle of the chassis end to end. Either design limits the maximum practical ratio of the retracted width to extended width without sacrificing structural integrity. This ratio of retracted to extended widths can be increased by offsetting the moving axles to either a side by side or an over and under design. Offsetting the axles greatly increases the difficulty in providing mechanical tie rods or other means of maintaining mechanical steering control between the wheels. It is desirable to control the steering of each wheel in an offset axle design individually as opposed to using mechanical tie rods or the like. With the elimination of the tie rod, the steering can be controlled electronically instead of mechanically providing an additional benefit not otherwise possible.

When a vehicle is propelled through a turn, the outside wheels travel a greater distance than the inside wheels. To prevent wheel skidding and power loss, provisions must be made in the drive system to allow the inside wheels to roll at a slower speed than the outside wheels. In the past, hydrostatic drive systems have incorporated means to allow the hydraulic flow to compensate for the speed of the inside and outside wheels for the tightest possible turn regardless of the actual turning angle. This is typically done with flow dividers with leakage provisions sufficient to span the difference in wheel flow requirements from the inside to outside wheels. This creates inefficiencies in the drive system that results in loss of tractive effort regardless of wheel angle. This characteristic is especially important on extending axle vehicles with large steering angle capability due to the large disparity of wheel speeds generated between the inside and outside wheels. To overcome this inherent loss of flow dividers, the steering sensors can be used to predict the rolling path and therefore the required wheel speed of each wheel as the steering angles change and steering modes change. The control system can then command the ideal flow from each of the two drive pumps, one for the right side of the machine and one for the left side.

In an exemplary embodiment of the invention, a vehicle is provided comprising a chassis supporting two front axle assemblies and two rear axle assemblies, each of the front and rear axle assemblies including an extendible and retractable axle supporting an independently steerable wheel and a steering mechanism. The respective axles of the front and rear axle assemblies are offset from each other. The vehicle is operable in a plurality of steering modes including two-wheel steer, crab steer and coordinated steer, wherein a steering angle for each steering wheel is determined according to a steering angle of an inside front wheel on a turn-by-turn basis. A wheel angle sensor may be disposed in cooperation with each wheel, and drive speed may be controlled on a proportional basis dependent on steer angle. Moreover, in the crab steering mode, all of the wheels are preferably controlled to substantially the same angle. In the coordinated steering mode, a projected vehicle pivot point is determined by an intercept of a line drawn perpendicularly through the center of the inside front wheel and a line drawn horizontally from a midpoint between the front and rear axle assemblies. In this arrangement, in the two-wheel steer mode and the coordinated steering mode, inside wheel rolling speed is slower than outside wheel rolling speed.

The vehicle may additionally include an operator-controlled steering switch communicating with at least the steering mechanisms of the front axle assemblies. In this context, the inside front wheel steering angle is determined according to a wheel position of the front inside wheel. In the two-wheel steering mode, a projected vehicle pivot point is determined by an intercept of a line drawn perpendicularly through the center of the inside front wheel and a line drawn horizontally from a midpoint between the axles of the two rear axle assemblies.

Each of the front and rear axle assemblies preferably includes a hydraulic cylinder coupled with the extendible and retractable axle, wherein fluid flow to the hydraulic cylinders is controlled with two directional valves, a first valve to extend and retract the front axle pair and a second valve to extend and retract the rear axle pair. The hydraulic cylinders may be controlled to effect extension and retraction of the axles only when the vehicle is traveling above a predetermined minimum speed. Additionally, four digital or analog switches may be coupled with the axles, respectively, the switches indicating that the axles are fully extended. In this context, drive and steering functions are controlled according to signals from the switches.

In another exemplary embodiment of the invention, a method of controlling vehicle steering and axle position with the vehicle of the present invention includes the steps of selectively operating the vehicle in one of a plurality of steeling modes including two-wheel steer, crab steer and coordinated steer; and determining a steering angle for each steering wheel according to a steering angle of an inside front wheel on a turn-by-turn basis.

BRIEF DESCRIPTION OF THE DRAWINGS

These and other aspects and advantages of the present invention will be described in detail with reference to the accompanying drawings, in which:

FIGS. 1A–1C illustrate steering modes of the system according to the present invention;

DETAILED DESCRIPTION OF PREFERRED EMBODIMENTS

With reference to FIGS. 4–7, a vehicle according to the present invention includes a chassis 12 supporting two front axle assemblies 16 and two rear axle assemblies 14. The respective assemblies 14, 16 are of similar construction, and thus only the rear axle assemblies 14 will be described in detail.

Figure 6:
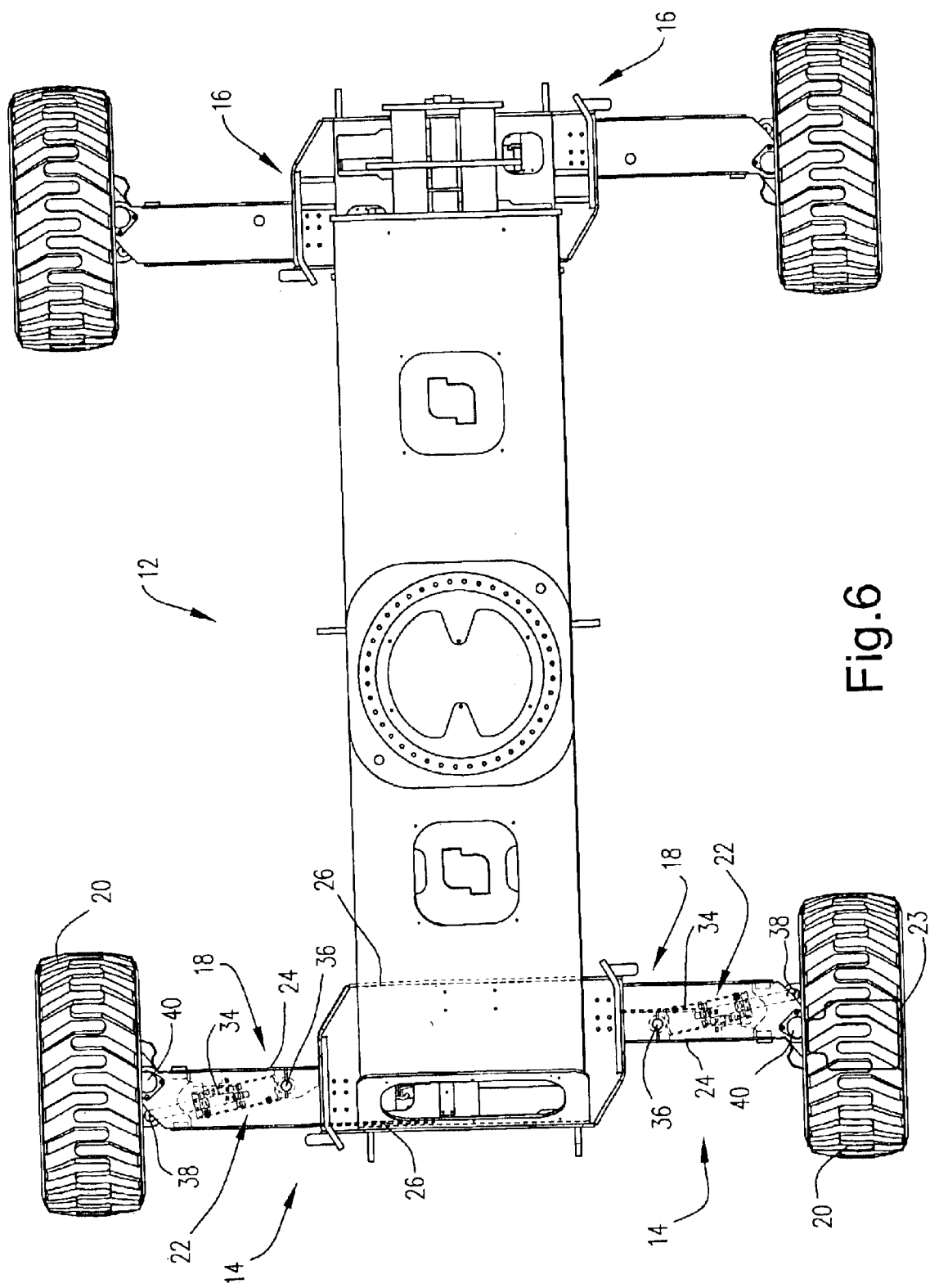
FIG. 6 is a plan view of the vehicle chassis with the wheel axles fully extended.
Figure 7:
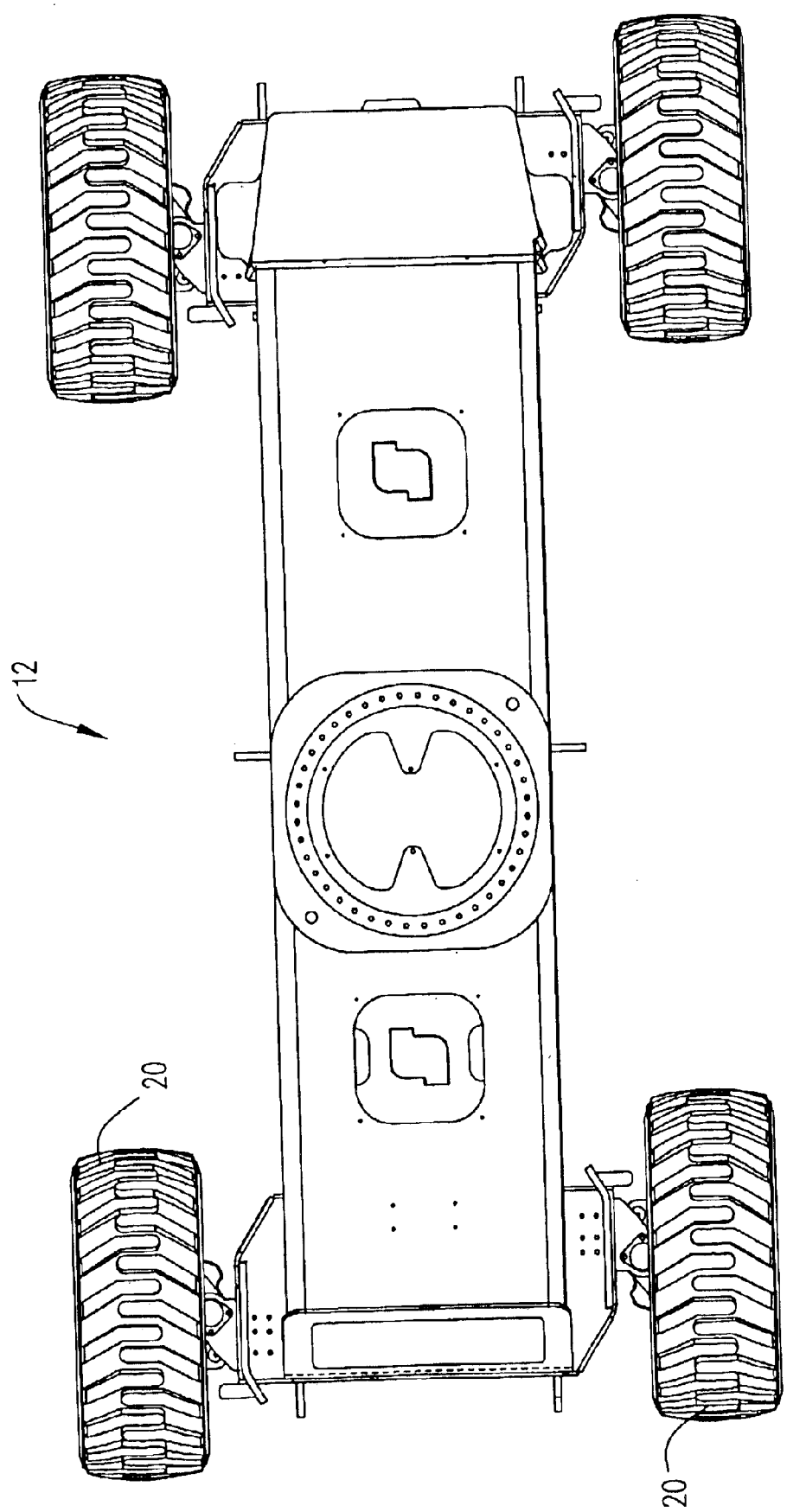
FIG. 7 is a plan view of the vehicle chassis with the axles in a retracted position.
Figure 9:
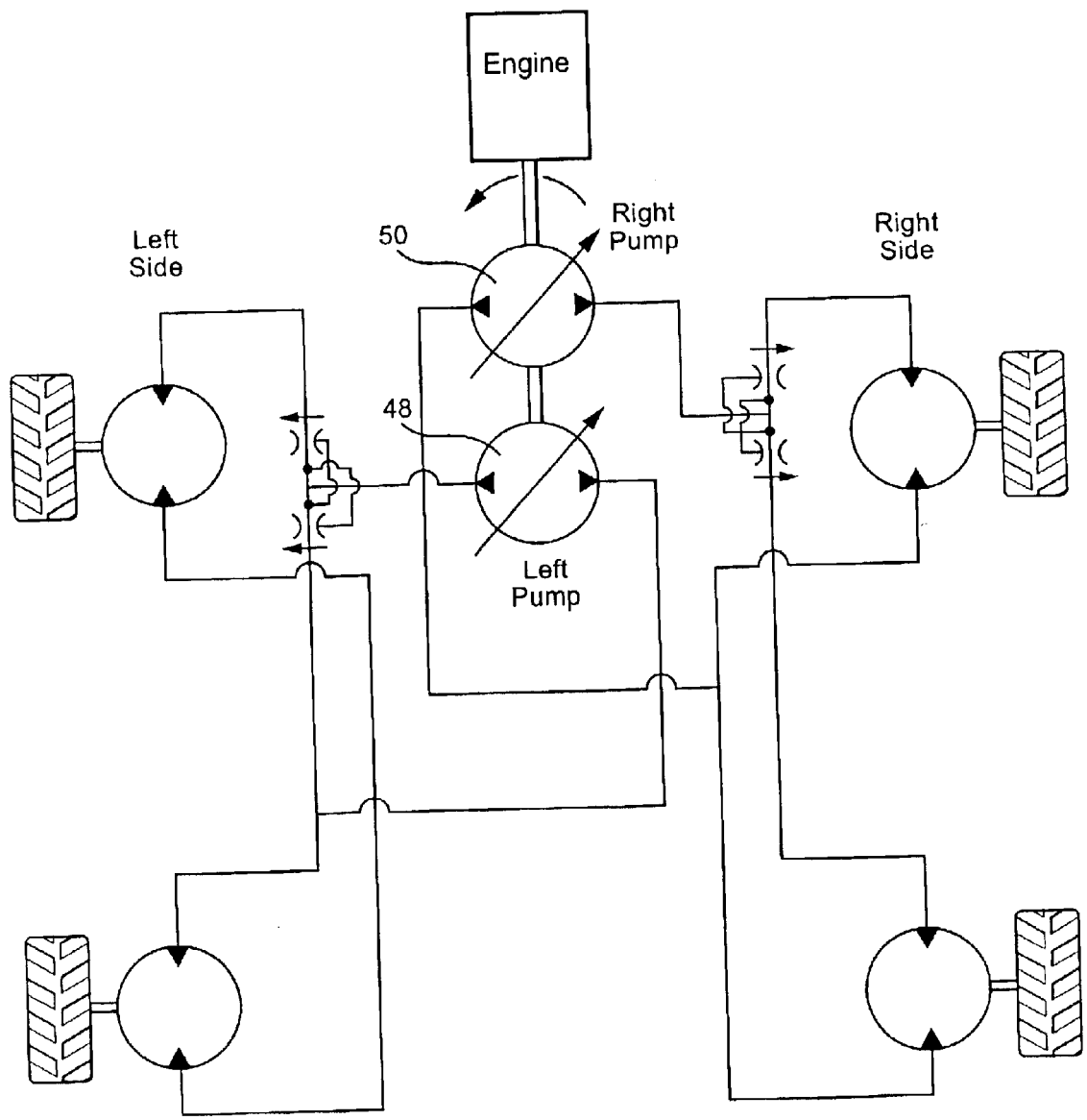
FIG. 9 is a drive system hydraulic schematic.

Each axle assembly 14 includes an extendible and retractable axle 18 supporting an independently steerable wheel 20 and a steering mechanism 22. The wheel drive, motor, brake and gear box assembly are shown schematically at 23 in FIGS. 4 and 6. Left 48 and right 50 drive pumps are shown in FIG. 9. As seen in FIGS. 6 and 7, the axles 18 of the respective front axle assemblies 16 and rear axle assemblies 14 are offset from each other.

Each extendible axle 18 is generally constructed of a telescopic axle member 24 operatively coupled and supported for extension and retraction via an axle frame member 26. A hydraulic cylinder 28 or like driving apparatus has its base fixed to the frame member 26 and an extension arm 30 secured to the telescopic axle member 24. In a preferred arrangement, the hydraulic cylinders 28 are operatively coupled with a source of hydraulic fluid to drive the hydraulic cylinders 28 via respective valves 31 (FIG. 8B). While all four axles have individual hydraulic cylinders 28, flow to the cylinders 28 may be controlled with one pair of valves 31, one to extend and retract the front axle pair and one to extend and retract the rear axle pair. In order to minimize wheel scrubbing during axle movement, a minimum drive speed is defined above which actual extension is permitted.

Four digital or analog switches 32 are used to indicate that the axles 18 are fully extended. Preferably, the switches 32 are connected in series (two pairs, front and rear) to simplify the control system interface. If the switches 32 indicate that the axles 18 are not set (fully extended) while the boom is out of an inherently stable or transport position, drive and steer functionality are suspended until the boom is brought back into transport position. Once in transport position, the operator can again attempt to set the axles 18. If they cannot be set, the operator is not permitted to move out of transport position.

To extend and retract the axles 18, the user engages an axle extend/retract switch and the drive control. The extend/retract valves 31 are engaged after a minimum duration (e.g., 0.5 seconds) of commanding drive to at least a minimum drive speed and are disengaged if the drive command falls below the minimum drive speed or if the extend/retract switch is disengaged.

FIG. 6 illustrates the vehicle chassis 12 with the axles 18 fully extended. FIG. 7 illustrates the chassis 12 with the axles fully retracted. In operation, when the axles are retracted as shown in FIG. 7, the chassis is maintained narrow enough for on-highway transportation without special permits. Upon reaching the work site, the axles 18 can be extended to provide added stability for boom or platform movement or manipulation.

By offsetting the axles 18 as shown in FIGS. 4–7, the amount of axle extension can be increased without sacrificing structural integrity. The offset axles, however, drive the need to steer each wheel individually as opposed to using a mechanical tie rod. With continued reference to FIG. 6, each steering mechanism 22 is provided with an individually controlled hydraulic cylinder 34 having its base end 36 secured to the telescopic axle member 24 and its piston end 38 secured to the wheel 20 offset from the wheel kingpin 40. Valves are provided to steer each wheel individually in both directions. Wheel angle sensors 42 detect the turn angle of each wheel 20 to provide optimal traction control on a turn-by-turn basis (electronic differential) and for wheel position precision.

With reference to FIGS. 1A–1C, there are at least three different modes for steering, including crab steering, coordinated steering and conventional two-wheel steering. Note that with the offset axles, the wheel kingpins 40 are not in line for the front or rear axles. The illustrations of the steering modes in FIGS. 1–3, however, are shown with the kingpins in line to simplify calculations while still providing accurate wheel tracking.

When the operator commands an adjustment to steering position, the control system commands movement of the inside front wheel. The resulting reading of the inside front wheel angle sensor (or master wheel) is used by the control system to calculate and control the optimum wheel angle positions for the remaining three wheels (or slave wheels) through a closed loop control circuit using the respective wheel angle sensors as feedback inputs. When the operator returns the steering switch to neutral, the inner wheel that has the largest inside angle of wheel position becomes the new master wheel with the remaining three wheels becoming the slave wheels. Left and right steering have different gain constants to correct for base and rod cylinder differences due to the specific orientation of the steer cylinders, which may not be necessary with other configurations. The control system automatically adjusts the wheel angle relationships during steering mode changes. A change in steering mode while the system is enabled causes the control system to adjust the wheel angles of the rear axles to the optimum angles for the selected steering mode and the wheel angle position reading of the master wheel angle sensor.

When in the crab steering mode, all wheels are controlled to the same angle.

Figure 2:
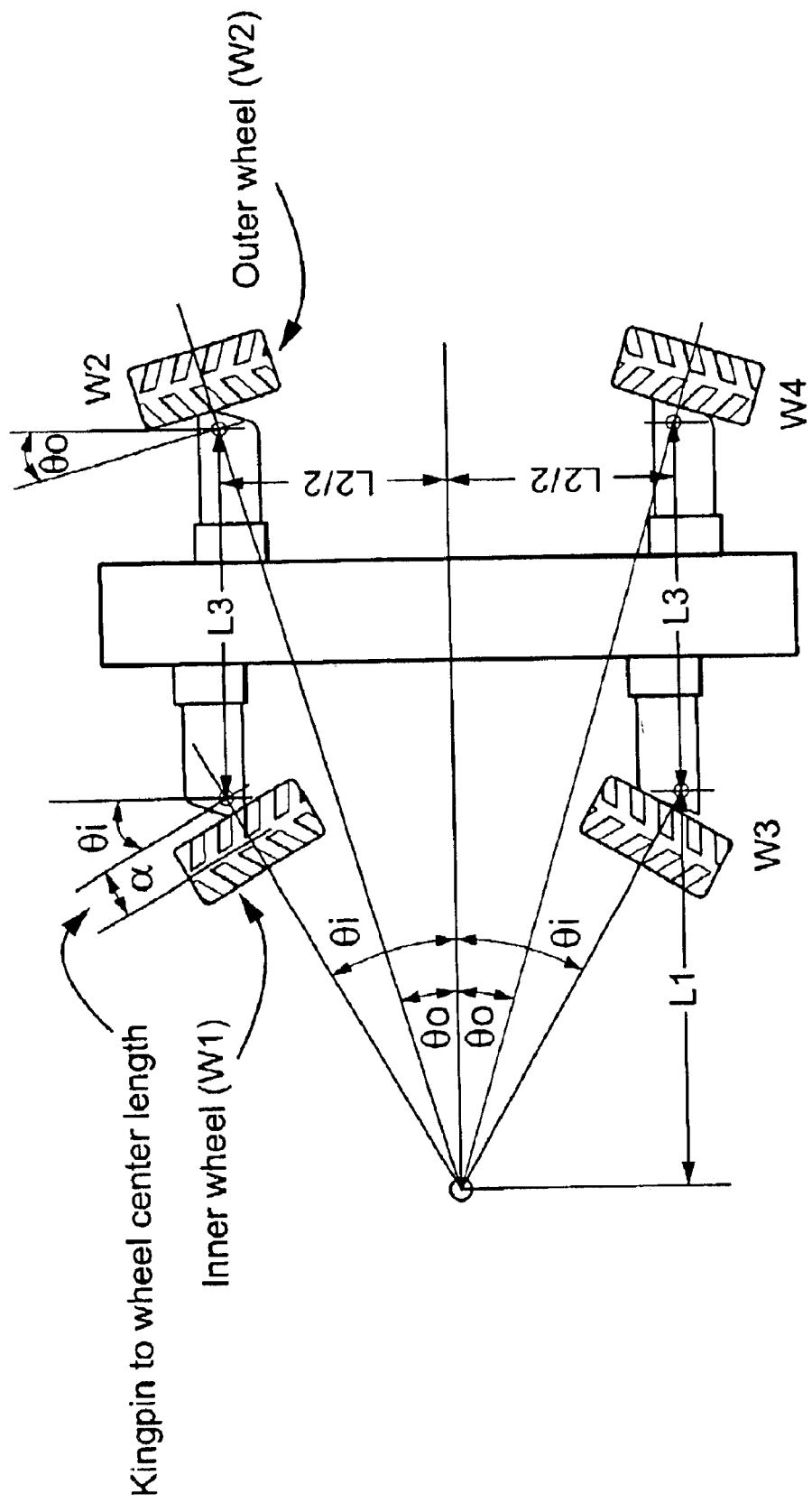
FIG. 2 illustrates the determination of angles in the coordinated steering mode.

In the coordinated steering mode, all four wheels effect steering of the vehicle. With reference to FIG. 2, the inside front and inside rear wheels are turned at equal but opposite angles, as is the case with the outer two wheels. A variant of Ackerman steering is applied to the coordinated steering mode. The projected vehicle pivot point is determined by the intercept of a line drawn perpendicularly through the center of the inner wheel and a line drawn horizontally from the center of the front and rear wheels. See, FIG. 2. The variables defined in FIG. 2 include:

θi: angle of front inner wheel (W1) (the operator controls this angle).

θo: calculated angle of front outer wheel (W2).

α: length from kingpin to wheel center (used when calculating wheel turn radius).

L1: calculated length from rear inner wheel (W3) kingpin to intercept of front inner wheel.

L2: length between front and rear kingpins.

L3: length between left and right kingpins (in this context, two lengths may be needed, one when the axles are fully retracted and one when the axles are fully extended—the fully retracted length is used when any one of the axle set limit switches indicates that an axle is not fully extended).

W1–W4: wheel numbers.

R: wheel radius.

C: wheel circumference.

Knowing θi and L2, L1 can be calculated as follows:

$$L1 = \frac{L2/2}{\tan(\theta i)}$$

Knowing L1, L2 and L3, θo can be calculated:

$$\theta o = a\tan\left(\frac{L2/2}{L1+L3}\right)$$

$$\theta o = a\tan\left(\frac{L2/2}{\frac{L2/2}{\tan(\theta i)}+L3}\right)$$

Figure 3:
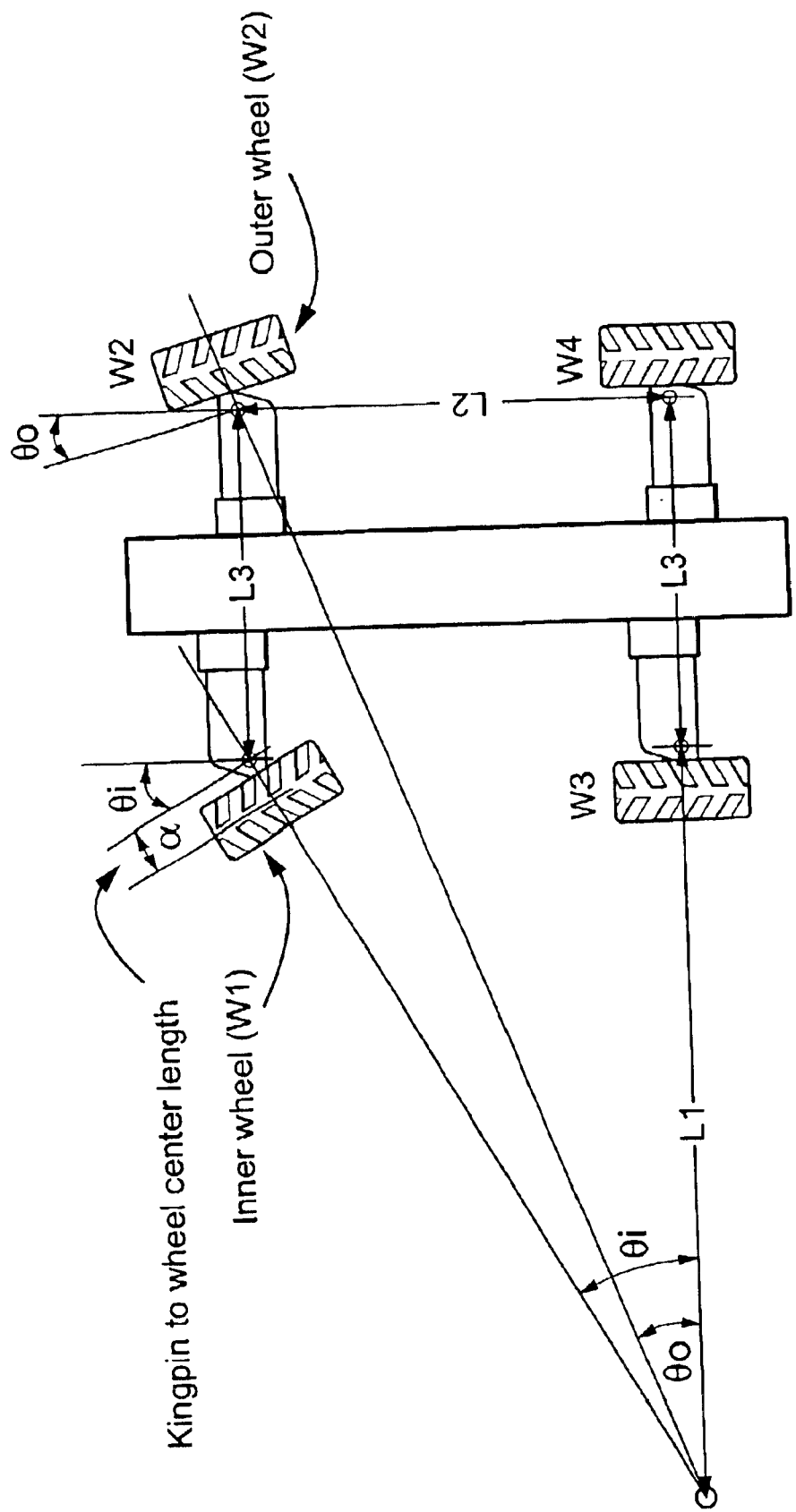
FIG. 3 illustrates the determination of steering angles in the two-wheel steering mode.
Figures 4, 5:
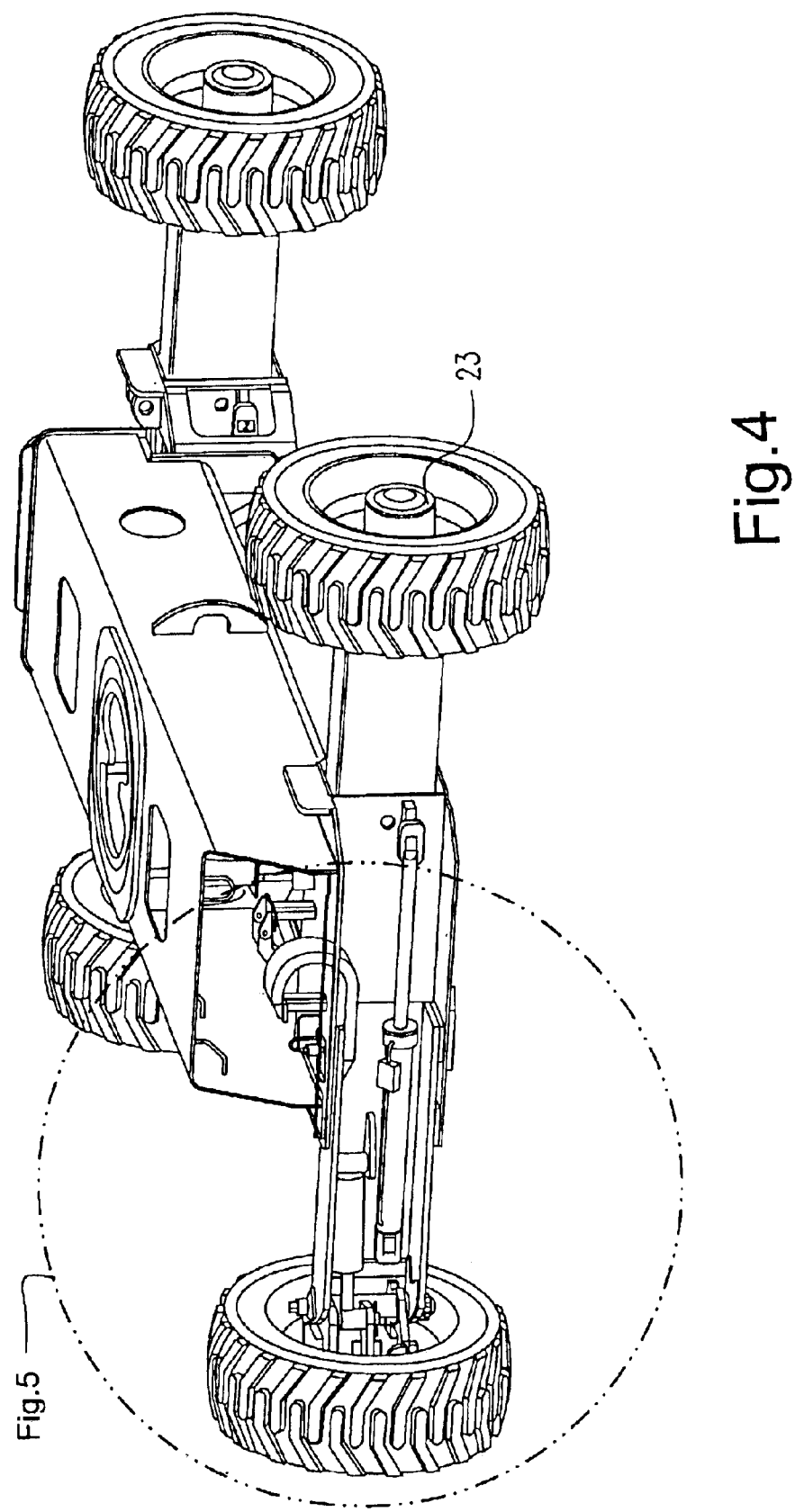
FIG. 4 is a perspective view of the vehicle chassis.
FIG. 5 is a detail view of the circled portion in FIG. 4.
Figure 5:
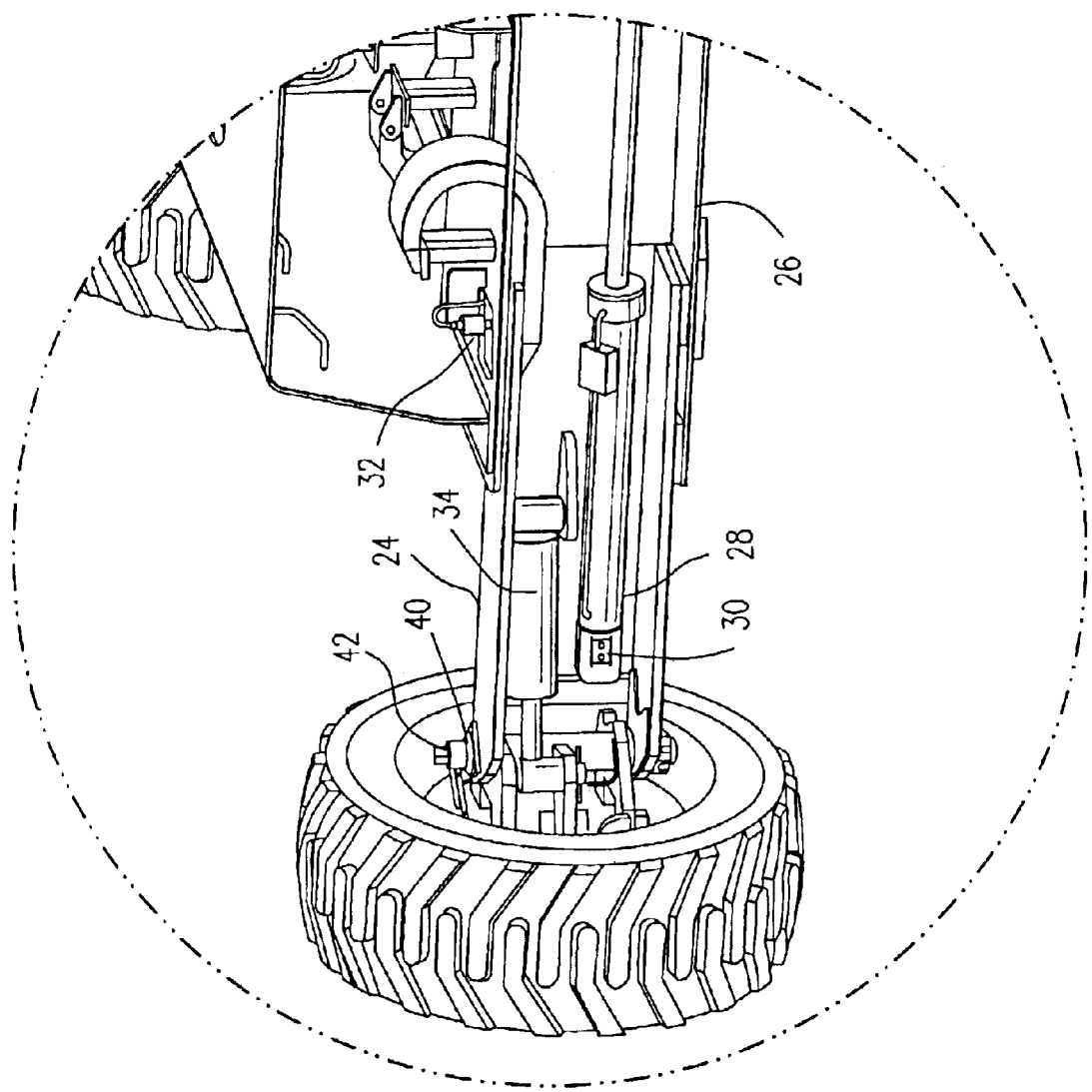

Conventional two-wheel steering has one pair of wheels fixed and steers the other pair. The Ackerman Principal describes the optimal angle for the wheels being steered to prevent tire scrubbing during turns. With reference to FIG. 3, as the vehicle is steered, the inside wheels travel along a tighter arc than the outside wheels. Ackerman steering refers to turning the inside and outside wheels at angles that follow the theoretical arcs. To determine the optimal angle of the front two wheels, a horizontal line is extended through the fixed rear axle. An angled line is drawn through the center of the inner front wheel. The outer front wheel angle is set so that a line extended through the center of this wheel crosses through the intercept of horizontal line and the line through the inner wheel. This is shown in FIG. 3. As shown, it is apparent that the inner front wheel is at a larger angle than the outer wheel.

The variables defined in FIG. 3 are as follows:

θi: Angle of front inner wheel (W1) (the operator controls this angle).

θo: Calculated angle of front outer wheel (W2).

α: Length from kingpin to wheel center (used when calculating wheel turn radius).

L1: Calculated length from rear inner wheel (W3) kingpin to intercept of front inner wheel.

L2: Length between front and rear kingpins.

L3: Length between left and right kingpins (note that two lengths are needed, one when the axles are fully retracted and one when the axles are fully extended—the fully retracted length is used when any one of the axle set limit switches indicates that an axle is not fully extended).

W1–W4: Wheel numbers.

R: Wheel Radius.

C: Wheel Circumference.

Knowing θi and L2, L1 can be calculated as follows:

$$L1 = \frac{L2}{\tan(\theta i)}$$

Knowing L1, L2 and L3, θo can be calculated as follows:

$$\theta o = a\tan\left(\frac{L2}{L1+L3}\right)$$

Vehicles such as boom lifts are typically driven while standing in the platform which is often a considerable distance from the center of the chassis. When the vehicle is traveling in a straight line, the platform is traveling at the same linear velocity as the center of the chassis. Because of the distance between the chassis and the driving position, the disparity of the linear velocity between the chassis and the driving position increases as the turning radius increases. This often limits the maximum drive speed of the vehicle to the speed considered safe and controllable during the maximum steer angle regardless of whether the vehicle is traveling in a straight line or being turned. To overcome this limitation, the steering sensors can be used to predict the turning radius, and the drive speed command can be used to predict the chassis velocity. The control system calculates and controls the maximum drive speed of the vehicle on a proportional basis dependent on steer angle. This results in an approximated constant linear platform velocity regardless of steer angle allowing the drive speed to be faster when driving straight and slower and therefor safer and more controllable when propelling the vehicle in turns.

There may be mechanical limitations on the maximum steering angle, which limit depends on the axle extension. For example, when fully retracted, the steering will be mechanically limited to preferably about 25° to avoid contact between tire and chassis. When fully extended, the steering will be mechanically limited to preferably about 45°. In between, the maximum angle mechanical limit will vary. Since the only known axle position is fully extended, anything but fully extended may cause a 25° limit to be imposed. If the steering angle is above 25° when the axles start to retract, the steering angle should be reduced, even if steering is not commanded.

Each wheel steering angle can be calibrated to properly align all wheels regardless of manufacturing variation. In a calibration mode, the control system allows the operator to individually select a wheel and make adjustments in the steering angle of that wheel. When the wheel is selected, the operator uses the steering control to move the wheel left or right. Once the two wheels in the left or right side are aligned, the control system instructs the controller to remember the correction factor for each wheel's angle sensor.

If a wheel cannot achieve its commanded angle within a specified time, the control system considers the wheel jammed. In this context, if a wheel becomes jammed during steering, a fault is reported and the remaining wheels continue to their commanded position. If a jammed wheel is more than a predefined angle out of position, the maximum drive speed is reduced.

When in crab mode, all wheels are steered to the same angle. If all but one of the sensors fail, operation could continue by commanding each steer valve the same as that of the wheel with the unfailed sensor. If all sensors fail, all wheels will still be steered based on time only, but their position to each other and with respect to mechanical limits will be unknown. It is possible that the wheels could become misaligned if the wheels steer at different speeds. If the sensor of the master wheel fails, another wheel will take over as the master according to a preset priority.

When in coordinated steer mode, the inner wheels steer at equal but opposite angles, as do the outer wheels. If one of the two inner or outer wheel sensors fails, control could be resumed by relying on the one remaining sensor and steering the wheel with the failed sensor in an equal but opposite manner. If both sensors on the inside or outside fail, all wheels are driven in the appropriate direction without attempting to control optimal Ackerman steering angles. A return to straight steering will not be possible without operator intervention and will be more noticeable depending on the angle the wheel was at when the sensor failed.

The operator can align the wheels by steering in the direction of the failed side until the remaining good sensors reach their maximum limit. This method of alignment may not align the wheels accurately because the mechanical limit reached by the failed wheel may be significantly different than the electrical limit. Steering in the direction of the good sensor will not align the wheels because steering will stop when its maximum limit is reached, preventing the failed wheel from aligning. If both sensors fail or if the reference regulator fails, steering would be able to continue into the mechanical stops for both wheels.

In the conventional two-wheel steering mode, W3 and W4 are not steered. If one or both of these sensors fail, an error is signaled and normal operation is continued. W1 and W2 are controlled in the same direction but at different angles. As soon as either or both of these sensors fail or if the reference regulator fails, Ackerman steering is abandoned, both wheels are steered identically, and an error is signaled. A return to straight steering is not possible without operator intervention and is more noticeable depending on the angle the wheel is at when the sensor failed. The operator can align the wheels by steering the wheels into the mechanical stops.

With reference to FIG. 9, in order to compensate for an inner and outer wheel speed differential while in the coordinated steering mode due to different turning radii, a Left 48 and Right 50 drive pump will be implemented to independently control speed for both sides of the vehicle. The speed control will be an open loop control on speed but a closed loop control on current to the drive pumps.

The wheel speed command calculations vary for each steering mode.

In the crab steering mode, since the wheel angles are the same, all of the wheels move at the same speed.

In the coordinated steering mode, both inner wheels move at the same speed, as do the outer wheels. The speed of the inner wheels is slower than the speed of the outer wheels. The circumference of all wheels is assumed to be the same. With an inner wheel steer angle of $\theta i$, the circumference of the circles traced out by each wheel is as follows.

$$C = 2 \cdot \pi \cdot R$$

$$\text{Circ\_W1} = \text{Circ\_W3} = 2 \cdot \pi \cdot \left(\frac{L2/2}{\sin(\theta i)}\right)$$

$$\text{Circ\_W2} = \text{Circ\_W4}$$

$$= 2 \cdot \pi \cdot \left(\frac{L2/2}{\sin(\theta o)}\right)$$

$$= 2 \cdot \pi \cdot \frac{L2/2}{\sin\left(\text{atan}\left(\frac{L2/2}{\frac{L2/2}{\tan(\theta i)} + L3}\right)\right)}$$

An inner wheel speed ratio will be calculated based on the turn angle of the inner wheel. The inner wheel speed command will be calculated by taking the outer wheel speed command times the inner to outer speed ratio. If the inner wheel is W1, then the inner to outer speed ratio will be calculated as follows:

$$\text{Speed\_W1} = \text{Speed\_W2} \cdot \frac{\text{Circ\_W1}}{\text{Circ\_W2}}$$

In the conventional steering mode, both inner wheels move at approximately the same speed, as do the outer wheels. The speed of the inner wheels is slower than the speed of the outer wheels. The circumference of all wheels is assumed to be the same. With an inner wheel steer angle of $\theta i$, the circumference of the circles traced out by the front wheels is as follows:

$$C = 2 \cdot \pi \cdot R$$

$$\text{Circ\_W1} = 2 \cdot \pi \cdot \left(\frac{L22}{\sin(\theta i)}\right)$$

$$\text{Circ\_W2} = 2 \cdot \pi \cdot \left(\frac{L2}{\sin(\theta o)}\right)$$

$$= 2 \cdot \pi \cdot \frac{L2}{\sin\left(\text{atan}\left(\frac{L2}{\frac{L2}{\tan(\theta i)} + L3}\right)\right)}$$

An inner wheel speed ratio will be calculated based on the turn angle of the inner wheel. The inner wheel speed command will be calculated by taking the outer wheel speed command times the inner to outer speed ratio. If the inner wheel is W1, then the inner to outer speed ratio will be calculated as follows:

$$\text{Speed\_W1} = \text{Speed\_W2} \cdot \frac{\text{Circ\_W1}}{\text{Circ\_W2}}$$

The Left 48 and Right 50 drive pump will need a forward and reverse crack point (or starting current) stored to help account for differences between the pumps. The system can be put in the calibration mode to adjust the starting current for the forward and reverse directions of each pump. Once a starting current has been determined, the control system is instructed to remember the correction factor for these starting currents.

Figure 8A:
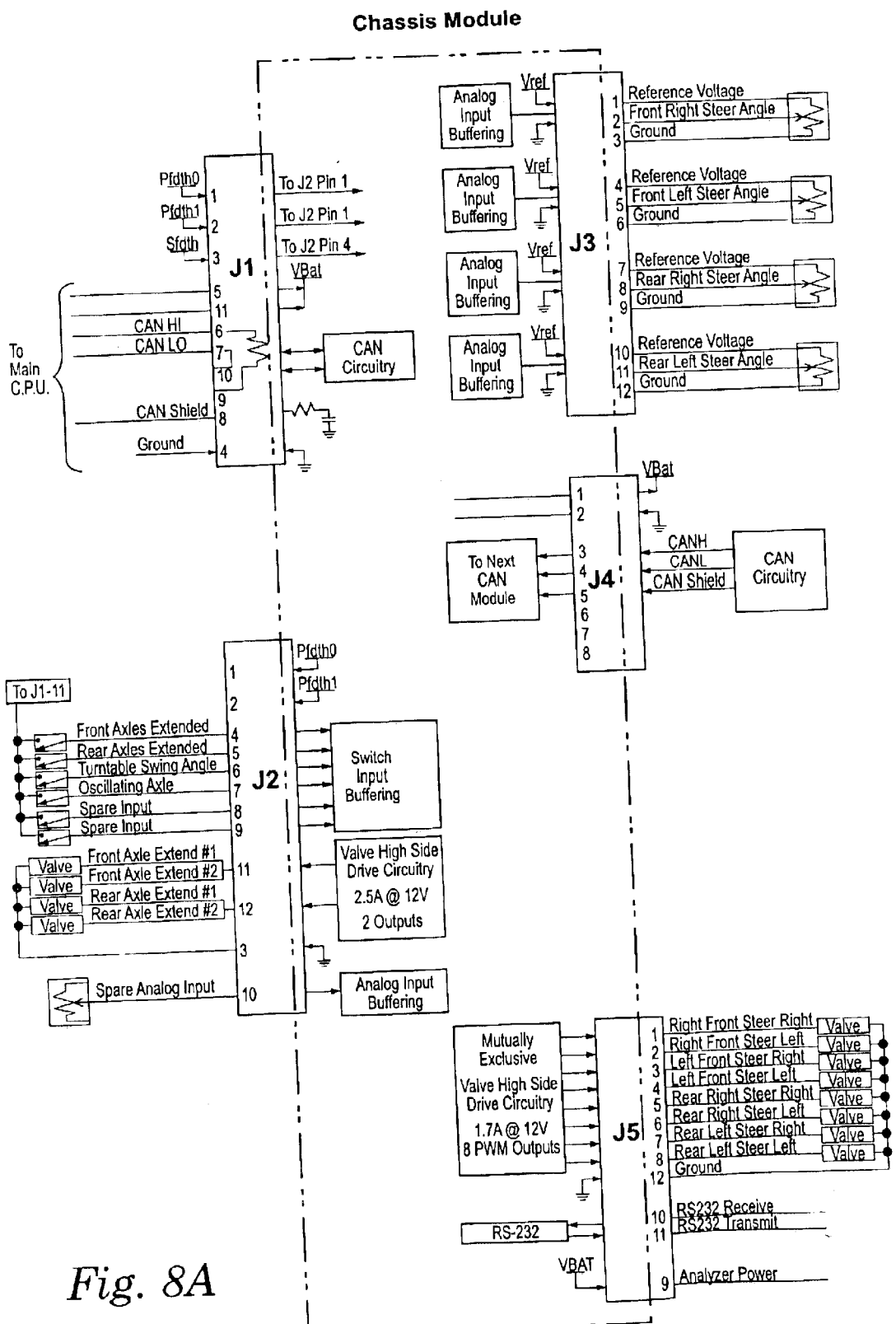
FIGS. 8A–8B are schematic diagrams of control circuitry for the system according to the present invention.
Figure 8B:
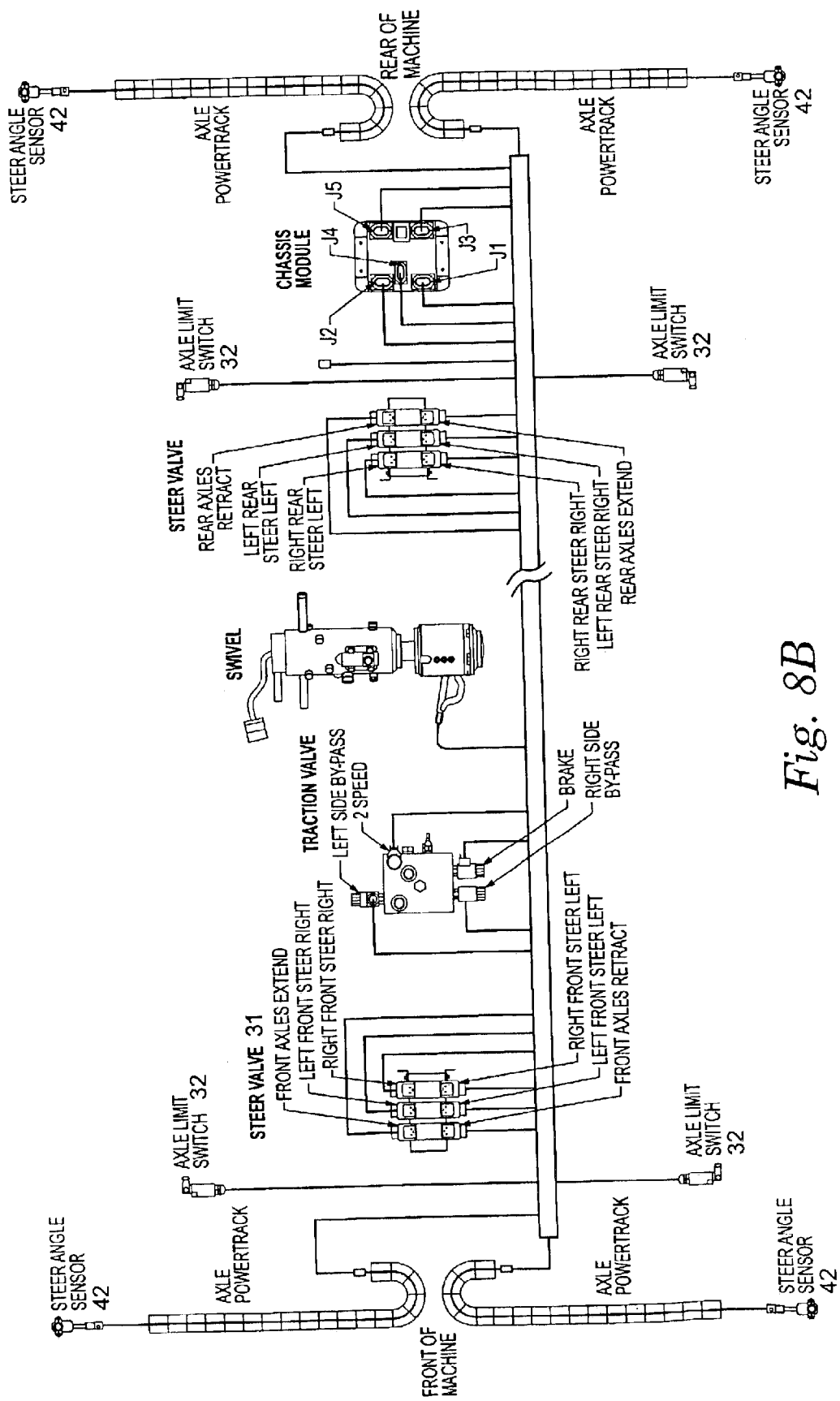

FIGS. 8A and 8B illustrate the chassis module I/O block diagram. These figures illustrate the inputs and outputs to the chassis control system as part of the overall vehicle CAN bus based control system. It identifies the wheel angle sensors 42, axle extended switches 32, and the outputs to the axle extend/retract and steer valves.

With the arrangement according to the present invention, offset extendible axles and individually controlled steering provide expanded functionality to an industrial vehicle such as a boom or platform lift. The offset axles maximize the extension capabilities to provide added stability during operation in the extended positions and highway-permitted transport in the retracted positions. Individual steering enables multiple steering modes to maximize maneuverability of the vehicle and minimize tire wear.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vehicle comprising a chassis supporting two front axle assemblies and two rear axle assemblies, each of the front and rear axle assemblies including an extendible and retractable axle supporting an independently steerable wheel and a steering mechanism, wherein the axles of the two front axle assemblies are offset from each other, and wherein the axles of the two rear axle assemblies are offset from each other, the vehicle being operable in a plurality of steering modes including two-wheel steer, crab steer and coordinated steer, wherein a steering angle for each steering wheel is determined according to a steering angle of an inside front wheel on a turn-by-turn basis, the inside front wheel changing according to a turning direction.

2. A vehicle according to claim 1, further comprising a wheel angle sensor disposed in cooperation with each wheel.

3. A vehicle according to claim 2, wherein a drive speed of the vehicle is controlled on a proportional basis dependent on steer angle.

4. A vehicle according to claim 1, wherein in the crab steering mode, all of the wheels are controlled to substantially the same angle.

5. A vehicle according to claim 1, wherein in the coordinated steering mode, a projected vehicle pivot point is determined by an intercept of a line drawn perpendicularly through a center of the inside front wheel and a line drawn horizontally from a midpoint between the front and rear axle assemblies.

6. A vehicle according to claim 1, further comprising an operator-controlled steering switch communicating with at least the steering mechanisms of the front axle assemblies, wherein the inside front wheel steering angle is determined according to a wheel position of the front inside wheel.

7. A vehicle according to claim 1, wherein in the two-wheel steering mode, a projected vehicle pivot point is determined by an intercept of a line drawn perpendicularly through a center of the inside front wheel and a line drawn horizontally from a midpoint between the axles of the two rear axle assemblies.

8. A vehicle according to claim 1, wherein each of the front and rear axle assemblies comprises a hydraulic cylinder coupled with the extendible and retractable axle, wherein fluid flow to the hydraulic cylinders is controlled with two directional valves, a first valve to extend and retract the axles of the front axle assemblies and a second valve to extend and retract the axles of the rear axle assemblies.

9. A vehicle according to claim 8, wherein the hydraulic cylinders are controlled to effect extension and retraction of the axles only when the vehicle is traveling above a predetermined minimum speed.

10. A vehicle according to claim 9, further comprising four digital or analog switches coupled with the axles, respectively, the digital or analog switches indicating that the axles are fully extended.

11. A vehicle according to claim 10, wherein drive and steering functions are controlled according to signals from the digital or analog switches.

12. A vehicle comprising a chassis supporting two front axle assemblies and two rear axle assemblies, each of the front and rear axle assemblies including an extendible and retractable axle supporting an independently steerable wheel and a steering mechanism, wherein the axles of the two front axle assemblies are offset from each other, and wherein the axles of the two rear axle assemblies are offset from each other, the vehicle being operable in a plurality of steering modes including two-wheel steer, crab steer and coordinated steer, wherein a steering angle for each steering wheel is determined according to a steering angle of an inside front wheel on a turn-by-turn basis, the inside front wheel changing according to a turning direction, the vehicle further comprising a left drive pump operatively coupled with the left front and rear steerable wheels and a right drive pump operatively coupled with the right front and rear steerable wheels, the left and right drive pumps independently controlling vehicle speed for respective sides of the vehicle.

13. A method of controlling vehicle steering and axle position, the vehicle including a chassis supporting two front axle assemblies and two rear axle assemblies, each of the front and rear axle assemblies including an extendible and retractable axle supporting an independently steerable wheel and a steering mechanism, wherein the axles of the two front axle assemblies are offset from each other, and wherein the axles of the two rear axle assemblies are offset from each other, the method comprising:

selectively operating the vehicle in one of a plurality of steering modes including two-wheel steer, crab steer and coordinated steer; and determining a steering angle for each steering wheel according to a steering angle of an inside front wheel on a turn-by-turn basis, the inside front wheel changing according to a turning direction.

14. A method according to claim 13, further comprising, in the coordinated steering mode, determining a projected vehicle pivot point by an intercept of a line drawn perpendicularly through a center of the inside front wheel and a line drawn horizontally from a midpoint between the front and rear axle assemblies.

15. A method according to claim 14, further comprising, in the coordinated steering mode, controlling inside wheel speed to be slower than outside wheel speed.

16. A method according to claim 13, further comprising, in the two-wheel steering mode, determining a projected vehicle pivot point by an intercept of a line drawn perpendicularly through a center of the inside front wheel and a line drawn horizontally from a midpoint between the axles of the two rear axle assemblies.

17. A method according to claim 13, wherein each of the front and rear axle assemblies comprises a hydraulic cylinder coupled with the extendible and retractable axle, the method further comprising controlling fluid flow to the hydraulic cylinders with two valves, a first valve to extend the axle and a second valve to retract the axle.

18. A method according to claim 17, wherein the hydraulic cylinders are controlled to effect extension and retraction of the axles only when the vehicle is traveling above a predetermined minimum speed.

19. A method according to claim 18, further comprising four digital or analog switches coupled with the axles, respectively, the digital or analog switches indicating that the axles are fully extended, wherein drive and steering functions are controlled according to signals from the digital or analog switches.

* * * * *